United States Patent
Murakami et al.

(10) Patent No.: US 10,493,551 B2
(45) Date of Patent: Dec. 3, 2019

(54) ARC WELDING APPARATUS, ARC WELDING SYSTEM, AND ARC WELDING METHOD

(71) Applicant: KABUSHIKI KAISHA YASKAWA DENKI, Kitakyushu-shi (JP)

(72) Inventors: Masafumi Murakami, Kitakyushu (JP); Taichi Sakamoto, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 434 days.

(21) Appl. No.: 14/296,389

(22) Filed: Jun. 4, 2014

(65) Prior Publication Data
US 2014/0360995 A1 Dec. 11, 2014

(30) Foreign Application Priority Data
Jun. 7, 2013 (JP) ................. 2013-120734

(51) Int. Cl.
*B23K 9/095* (2006.01)
*B23K 9/10* (2006.01)
*B23K 9/12* (2006.01)

(52) U.S. Cl.
CPC .......... *B23K 9/0953* (2013.01); *B23K 9/0956* (2013.01); *B23K 9/1062* (2013.01); *B23K 9/125* (2013.01)

(58) Field of Classification Search
CPC .. B23K 9/0953; B23K 9/0956; B23K 9/1062; B23K 9/125
See application file for complete search history.

(56) References Cited

U.S. PATENT DOCUMENTS

| 4,717,807 A | 1/1988 | Parks et al. | |
| 4,835,360 A * | 5/1989 | Parks ..................... | B23K 9/091 219/130.21 |

(Continued)

FOREIGN PATENT DOCUMENTS

| CN | 102380691 | 3/2012 |
| CN | 102652045 | 8/2012 |

(Continued)

OTHER PUBLICATIONS

Translation of JP 2012006020.*

(Continued)

*Primary Examiner* — Ibrahime A Abraham
*Assistant Examiner* — Frederick F Calvetti
(74) *Attorney, Agent, or Firm* — Mori & Ward, LLP

(57) ABSTRACT

An arc welding apparatus includes: a driver for advancing and retreating a welding consumable with respect to a workpiece to generate a short circuit condition and an arc condition; a state detector for detecting respective starts of the short circuit condition and the arc condition based on a voltage between the workpiece and the welding consumable; a time detector for detecting that an elapsed time from the start of the short circuit condition reaches a reference time using a time shorter than an estimated continuation time of the short circuit condition as the reference time; and a power controller for reducing an electric current between the workpiece and the welding consumable corresponding to a state where the elapsed time reaches the reference time and raising the electric current after the start of the arc condition.

23 Claims, 7 Drawing Sheets

(56) References Cited

U.S. PATENT DOCUMENTS

| | | | | |
|---|---|---|---|---|
| 5,245,546 A * | 9/1993 | Iceland | ............... | G05F 1/08 |
| | | | | 219/121.3 |
| 6,518,545 B1 * | 2/2003 | Richard | ............... | B23K 9/1062 |
| | | | | 219/130.21 |
| 7,598,474 B2 * | 10/2009 | Hutchison | ............... | B23K 9/091 |
| | | | | 219/130.01 |
| 7,705,270 B2 * | 4/2010 | Norrish | ............... | B23K 9/09 |
| | | | | 219/130.21 |
| 7,800,016 B2 * | 9/2010 | Era | ............... | B23K 9/091 |
| | | | | 219/130.21 |
| 7,960,672 B2 * | 6/2011 | Nishimura | ............... | B23K 9/0671 |
| | | | | 219/125.1 |
| 2005/0269306 A1 * | 12/2005 | Fulmer | ............... | B23K 9/09 |
| | | | | 219/130.51 |
| 2008/0264917 A1 * | 10/2008 | White | ............... | B23K 9/092 |
| | | | | 219/130.51 |
| 2008/0264923 A1 * | 10/2008 | White | ............... | B23K 9/092 |
| | | | | 219/137 PS |
| 2009/0026188 A1 | 1/2009 | Schorghuber | | |
| 2010/0176104 A1 * | 7/2010 | Peters | ............... | B23K 9/0738 |
| | | | | 219/130.21 |
| 2012/0074114 A1 | 3/2012 | Kawamoto et al. | | |
| 2012/0097656 A1 | 4/2012 | Peters | | |
| 2012/0145690 A1 * | 6/2012 | Kawamoto | ............... | B23K 9/067 |
| | | | | 219/130.5 |
| 2012/0223063 A1 | 9/2012 | Tanaka et al. | | |
| 2012/0255940 A1 * | 10/2012 | Fujiwara | ............... | B23K 9/1012 |
| | | | | 219/137 R |
| 2012/0303175 A1 * | 11/2012 | Lambert | ............... | B23K 9/0953 |
| | | | | 700/298 |
| 2013/0020289 A1 * | 1/2013 | Peters | ............... | B23K 9/04 |
| | | | | 219/121.6 |

FOREIGN PATENT DOCUMENTS

| | | |
|---|---|---|
| CN | 102794543 | 11/2012 |
| EP | 2272615 | 1/2011 |
| EP | 2335857 | 6/2011 |
| EP | 1607162 B1 | 7/2011 |
| JP | 2004-298924 | 10/2004 |
| JP | 2009101370 * | 5/2009 |
| JP | 2010-167502 | 8/2010 |
| JP | 2010-221226 | 10/2010 |
| JP | 2011-098375 | 5/2011 |
| JP | 2012-006020 | 1/2012 |
| JP | 2012-166249 | 9/2012 |
| JP | 2013-071154 | 4/2013 |
| JP | 2013-094840 | 5/2013 |
| WO | WO 99/46078 | 9/1999 |
| WO | WO 03/101658 | 12/2003 |

OTHER PUBLICATIONS

Japanese Office Action for corresponding JP Application No. 2013-120734, dated Dec. 1, 2015 (w/ English machine translation).

Extended European Search Report for corresponding EP Application No. 14169664.1-1702, dated Aug. 5, 2015.

Korean Office Action for corresponding KR Application No. 10-2014-0067325, dated Aug. 6, 2015.

Chinese Office Action for corresponding CN Application No. 201410216916.0, dated Aug. 26, 2015.

Korean Office Action for corresponding KR Application No. 10-2014-0067325, dated Feb. 22, 2016 (w/ English machine translation).

Japanese Office Action for corresponding JP Application No. 2013-120734, dated May 19, 2015.

Notice of Opposition for corresponding EP Application No. 14169664.1-1702, Nov. 21, 2017 (w/ machine translation).

Summons to attend oral proceedings pursuant to Rule 115(1) EPC for corresponding EP Application No. 14169664.1-1016, Oct. 2, 2018.

Interlocutory Decision for corresponding EP Application No. 14169664.1, Jun. 17, 2019.

* cited by examiner

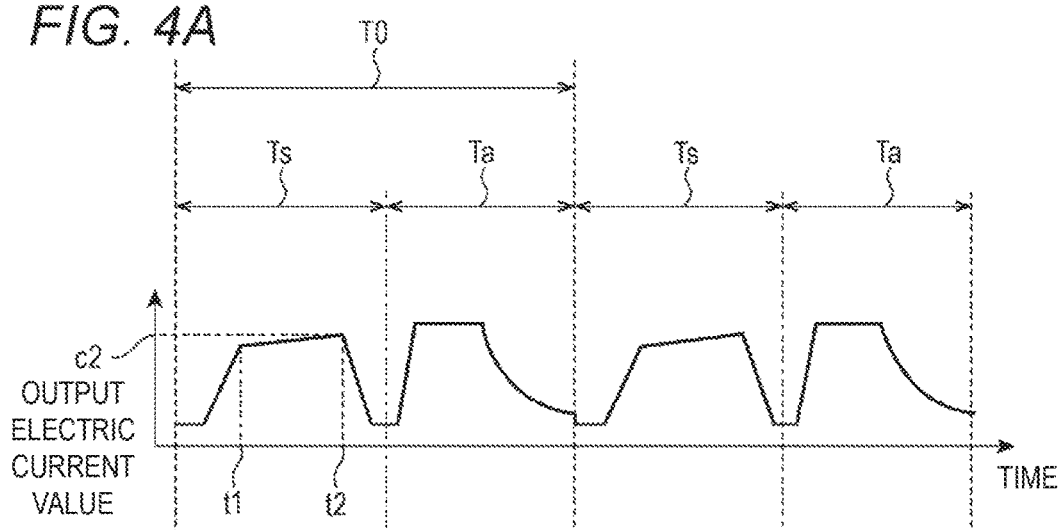
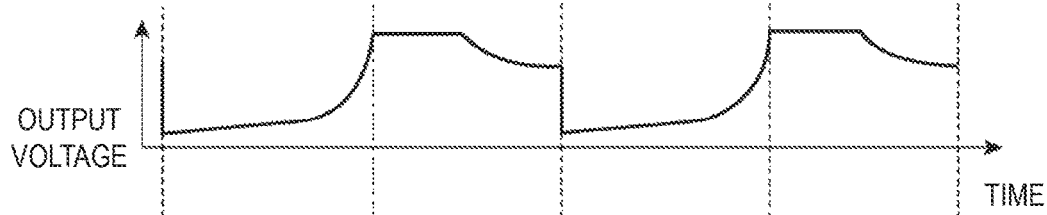
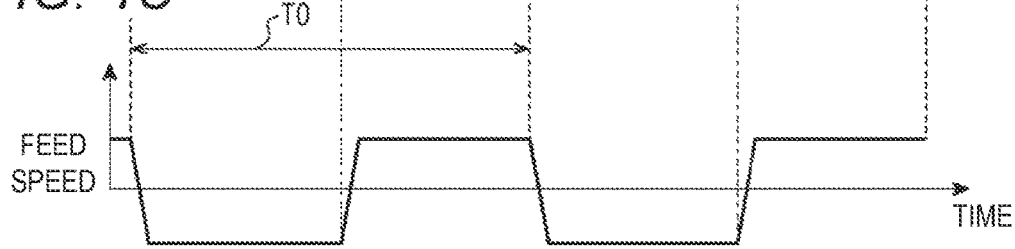

ARC WELDING APPARATUS, ARC WELDING SYSTEM, AND ARC WELDING METHOD

CROSS-REFERENCE TO RELATED APPLICATION

This application claims priority from Japanese Patent Application No. 2013-120734 filed with the Japan Patent Office on Jun. 7, 2013, the entire content of which is hereby incorporated by reference.

BACKGROUND

1. Technical Field

This disclosure relates to an arc welding apparatus, an arc welding system, and an arc welding method.

2. Related Art

In production of various products, an arc welding apparatus is used. The arc welding apparatus performs welding while repeatedly generating a short circuit condition and an arc condition has been used. In an arc welding process, the reduction of spatter is required for improving the productivity. In order to reduce spatter, it is effective to reduce the electric current between a workpiece and a welding consumable during the transition to the arc condition. For example, JP-A-2011-98375 discloses an arc welding apparatus that detects the constriction of the welding consumable generated immediately before the start of the arc condition based on a voltage rise between the workpiece and the welding consumable. This apparatus reduces the electric current corresponding to the detection result.

SUMMARY

An arc welding apparatus, includes: a driver configured to advance and retreat a welding consumable with respect to a workpiece to generate a short circuit condition and an arc condition; a state detector configured to detect a start of the short circuit condition and a start of the arc condition based on a voltage between the workpiece and the welding consumable; a time detector configured to detect that an elapsed time from the start of the short circuit condition reaches a reference time using a time shorter than an estimated continuation time of the short circuit condition as the reference time; and a power controller configured to reduce an electric current between the workpiece and the welding consumable corresponding to a state where the elapsed time reaches the reference time and raise the electric current after the start of the arc condition.

BRIEF DESCRIPTION OF DRAWINGS

FIGS. 4A to 4C are graphs illustrating an electric current, a voltage, and a wire feeding speed during welding;

DETAILED DESCRIPTION

Figure 1:
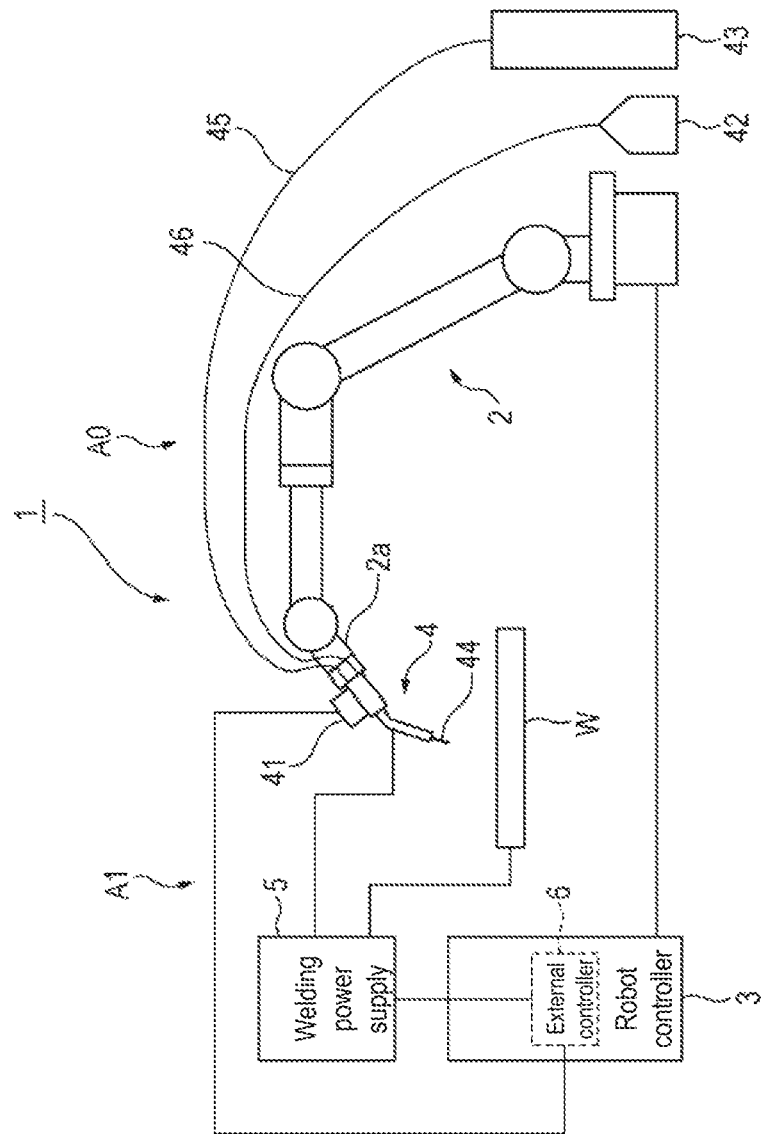
FIG. 1 is a schematic diagram of an arc welding system that includes an arc welding apparatus according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An arc welding apparatus according to one embodiment of this disclosure includes: a driver configured to advance and retreat a welding consumable with respect to a workpiece to generate a short circuit condition and an arc condition; a state detector configured to detect a start of the short circuit condition and a start of the arc condition based on a voltage between the workpiece and the welding consumable; a time detector configured to detect that an elapsed time from the start of the short circuit condition reaches a reference time using a time shorter than an estimated continuation time of the short circuit condition as the reference time; and a power controller configured to reduce an electric current between the workpiece and the welding consumable corresponding to a state where the elapsed time reaches the reference time and raise the electric current after the start of the arc condition.

The arc welding apparatus according to one embodiment of this disclosure may be, for example, an apparatus for performing welding while repeatedly generating a short circuit condition and an arc condition.

An arc welding system according to one embodiment of this disclosure includes: the above-described arc welding apparatus; and a welding robot configured to hold and move the driver.

An arc welding method performed by an arc welding apparatus according to one embodiment of this disclosure includes: advancing and retreating a welding consumable with respect to a workpiece to generate a short circuit condition and an arc condition; detecting a start of the short circuit condition and a start of the arc condition based on a voltage between the workpiece and the welding consumable; detecting that an elapsed time from the start of the short circuit condition reaches a reference time using a time shorter than an estimated continuation time of the short circuit condition as the reference time; reducing an electric current between the workpiece and the welding consumable corresponding to a state where the elapsed time reaches the reference time; and raising the electric current after the start of the arc condition.

According to one embodiment of this disclosure, spatter can be reduced.

The following describes preferred embodiments of this disclosure in detail with reference to the accompanying drawings. In the following description, like reference numerals designate corresponding or identical elements or elements with corresponding or identical functions, and therefore such elements will not be further elaborated here.

First Embodiment

As illustrated in FIG. 1, an arc welding system 1 includes a robot apparatus A0 and an arc welding apparatus A1. The robot apparatus A0 includes a robot 2 and a robot controller 3. The robot 2 is, for example, a serial-link robot arm. The robot 2 includes a tip portion with a tool mounter 2a. On the tool mounter 2a of the robot 2, a welding torch 4 described later is mounted. The robot controller 3 controls actuators of the robot 2 such that the welding torch 4 moves along a welding target portion.

While repeatedly advancing and retreating a welding wire (welding consumable) 44 with respect to a workpiece W, the arc welding apparatus A1 supplies electric power between the welding wire 44 and the workpiece W so as to repeatedly generate a short circuit condition and an arc condition. The arc welding apparatus A1 includes the welding torch 4, an external controller 6, and a welding power supply 5.

The welding torch 4 is mounted on the tool mounter 2a of the robot 2 as described above. To the welding torch 4, a pail pack 42 is coupled via a conduit cable 46. Further, to the welding torch 4, a gas cylinder 43 is coupled via a gas hose 45. The pail pack 42 houses the welding wire 44 wound in a coil shape. The pail pack 42 supplies the welding wire 44 to the welding torch 4 through the conduit cable 46. The welding wire 44 is fed from the tip of the welding torch 4. The gas cylinder 43 contains shielding gas. The gas cylinder 43 supplies the shielding gas to the welding torch 4 through the gas hose 45. The shielding gas can employ, for example, carbon dioxide, argon, or the mixed gas of these.

The welding torch 4 includes a feeding mechanism 41. The feeding mechanism 41 performs, for example, forward feed and reverse feed of the welding wire 44 using an actuator such as a servo motor as a power source. The forward feed means that the welding wire 44 is advanced such that the tip of the welding wire 44 approaches the workpiece W. The reverse feed means that the welding wire 44 is retreated such that the tip of the welding wire 44 moves away from the workpiece W. That is, the feeding mechanism 41 corresponds to a driver that advances and retreats the welding wire 44 with respect to the workpiece W. The robot 2 on which the welding torch 4 is mounted corresponds to a welding robot that holds and moves the driver.

Figure 2:
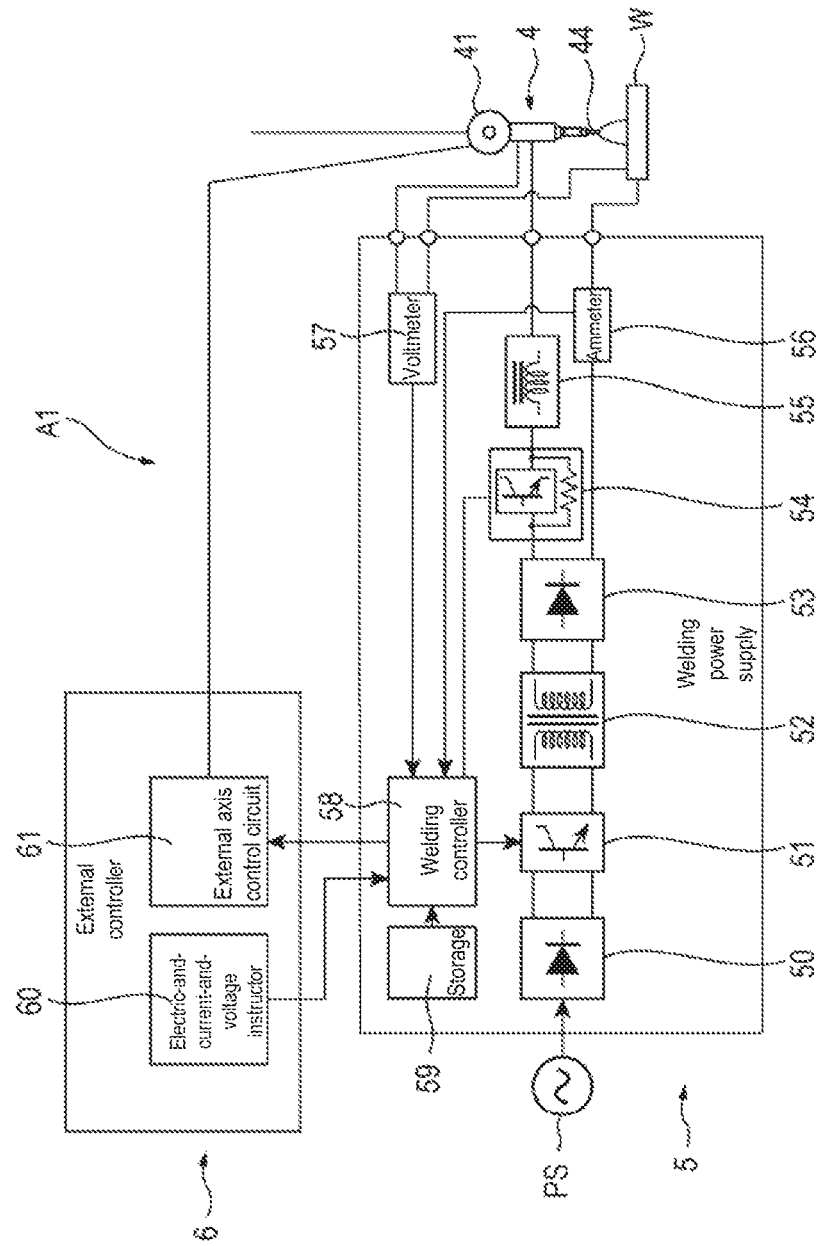
FIG. 2 is a pattern diagram illustrating the configuration of the arc welding apparatus.

The external controller 6 is incorporated in the robot controller 3. As illustrated in FIG. 2, the external controller 6 includes an electric-current-and-voltage instructor 60 and an external axis control circuit 61. The electric-current-and-voltage instructor 60 acquires the set values of the electric current and the voltage from outside (for example, a user) through an input unit (not illustrated), for example, a keyboard or a touchscreen. The electric-current-and-voltage instructor 60 outputs these set values as analog or digital signals. The external axis control circuit 61 is disposed in the robot controller 3 to control, for example, an actuator such as an actuator of a tool to be mounted on the tool mounter 2a other than the actuators of the robot 2. The external axis control circuit 61 controls the actuator of the feeding mechanism 41 in this embodiment.

The welding power supply 5 includes a primary rectifier circuit 50, a switching circuit 51, a transformer 52, a secondary rectifier circuit 53, a cut-off circuit 54, a reactor 55, an ammeter 56, a voltmeter 57, a welding controller 58, and a storage 59. The welding power supply 5 supplies the electric power for welding to the welding torch 4 and the workpiece W.

The primary rectifier circuit 50 is coupled to a commercial AC power supply PS and rectifies alternating current. The switching circuit 51 adjusts the supply power to the welding torch 4 by PWM. The transformer 52 transforms the output from the switching circuit 51, and insulates the input side and output side from each other. The secondary rectifier circuit 53 further rectifies the output from the transformer 52. The cut-off circuit 54 is constituted of, for example, a semiconductor. The cut-off circuit 54 cuts off the supply power to the welding torch 4 in response to a cut-off command. The reactor 55 smoothes the supply power to the welding torch 4. The ammeter 56 measures the electric current (hereinafter referred to as "output electric current") between the welding torch 4 and the workpiece W. The voltmeter 57 measures the voltage (hereinafter referred to as "output voltage") between the welding torch 4 and the workpiece W.

The welding controller 58 is a computer that controls the feeding mechanism 41 and the switching circuit 51 so as to perform an arc welding method according to this embodiment. The storage 59 is, for example, a non-volatile memory. The storage 59 stores, for example, the control patterns of feeding of the welding wire 44, the output electric current, and the output voltage, and/or various values described later.

Figure 3:
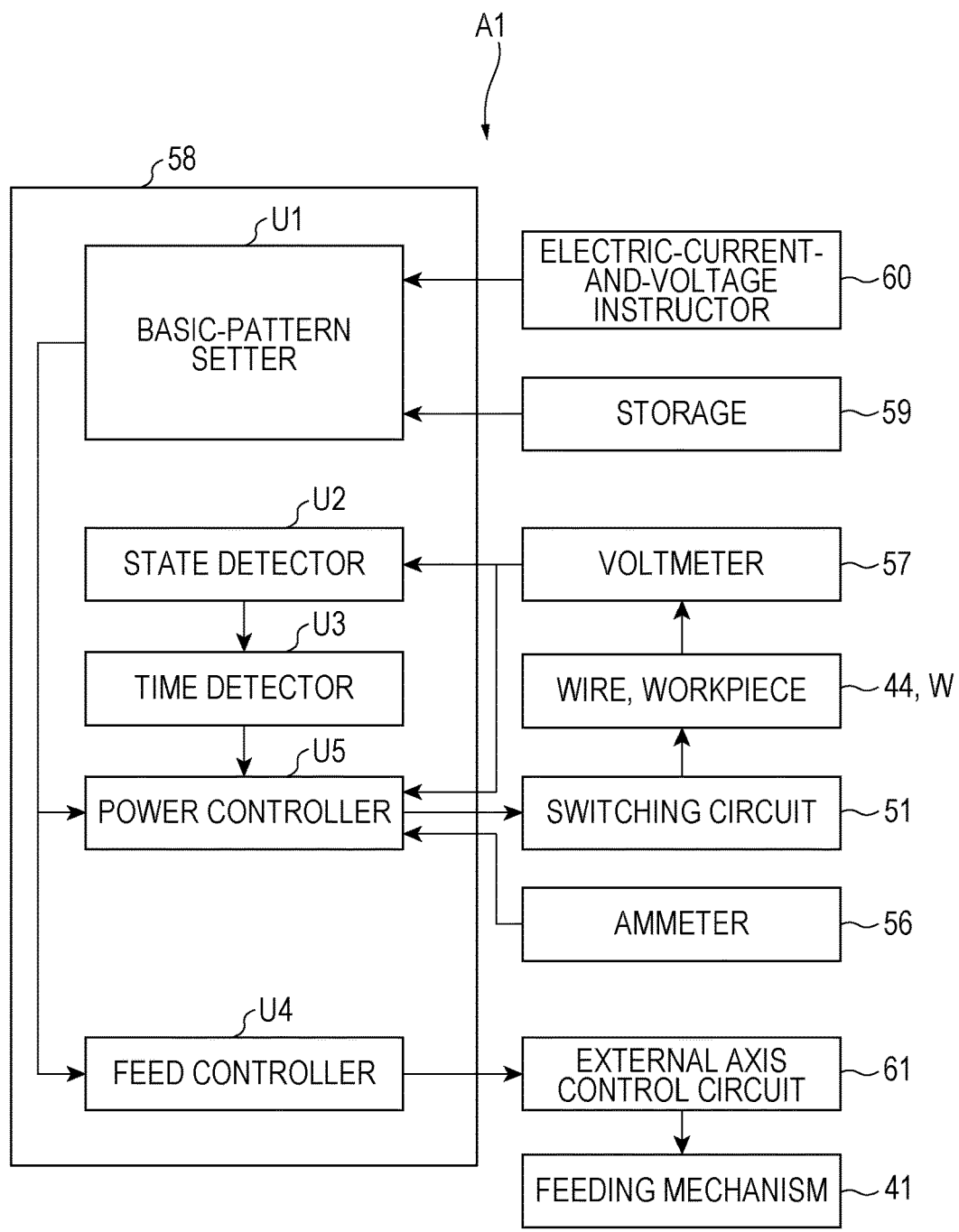
FIG. 3 is a block diagram illustrating the functional configuration of the arc welding apparatus.

As illustrated in FIG. 3, the welding controller 58 includes a basic-pattern setter U1, a state detector U2, a time detector U3, a feed controller U4, and a power controller U5. While illustration is omitted, respective members of the welding controller 58 are configured to refer to the various values and similar data stored in the storage 59. The basic-pattern setter U1 acquires the set values of the electric current and the voltage from the electric-current-and-voltage instructor 60 to set a control pattern (hereinafter, this control pattern is referred to as "basic pattern") appropriate for these set values. Specifically, the basic-pattern setter U1 selects a control pattern appropriate for the set values of the electric current and the voltage as the basic pattern from the control patterns stored in the storage 59. The basic-pattern setter U1 also can set the basic pattern of the feed speed.

The state detector U2 detects the start of the arc condition based on a rise in output voltage. Additionally, the state detector U2 detects the start of the short circuit condition based on a drop in output voltage. The time detector U3 measures the elapsed time with reference to the time at the start of the short circuit condition for each short circuit condition. Additionally, the time detector U3 detects that this elapsed time reaches a predetermined reference time. The reference time is a time shorter than the estimated continuation time of the short circuit condition. The continuation time of the short circuit condition is, for example, a value that is obtained by experiment or similar method in advance and stored in the storage 59. The continuation time of the short circuit condition is, for example, estimated based on the feed speed of the welding wire 44. The continuation condition of the short circuit time may be a value stored in the storage 59.

The feed controller U4 outputs the target values for the feed speed to the external axis control circuit 61 so as to control the feeding mechanism 41. The power controller U5 drives the switching circuit 51 such that the output electric current and the output voltage approach the target values. With reference to FIGS. 4A to 4C, a description will be given of a concrete example of controls performed by the feed controller U4 and the power controller U5.

FIG. 4A is a graph illustrating a waveform of the output electric current. In FIG. 4A, the horizontal axis denotes the time while the vertical axis denotes the output electric current value. FIG. 4B is a graph illustrating a waveform of the output voltage. In FIG. 4B, the horizontal axis denotes the time while the vertical axis denotes the output voltage value. FIG. 4C is a graph illustrating a waveform of the feed speed. The horizontal axis in FIG. 4C denotes the time. The vertical axis in FIG. 4C denotes the feed speed assuming that the forward feed side is the positive side while the reverse feed side is the negative side. Here, FIG. 4C illustrates the feed speed with the trapezoidal waveform. This, however, should not be construed in a limiting sense. The feed speed may have a sine wave shape, a rectangular wave shape, or a triangular wave shape. The same applies to FIG. 6D and FIG. 7D described later.

The feed controller U4 acquires the basic pattern of the feed speed from the basic-pattern setter U1. The feed controller U4 controls the feeding mechanism 41 to repeat the forward feed and the reverse feed of the welding wire 44 in accordance with the basic pattern. The basic pattern of the feed speed is, for example, set to repeat the forward feed and the reverse feed with a cycle T0 (see FIG. 4C). Here, in this embodiment, the forward feed and the reverse feed of the welding wire 44 by the feeding mechanism 41 are performed concurrently with movement of the welding torch 4 by the robot 2.

When the forward feed of the welding wire 44 is performed, the fusion portion of the welding wire 44 and the workpiece W are brought into contact with each other in the course of the forward feed. Accordingly, the short circuit condition is started. When the reverse feed of the welding wire 44 is performed, the welding wire 44 and the workpiece W are separated from each other in the course of the reverse feed. Accordingly, the arc condition is started. Thus, the short circuit condition and the arc condition are repeated corresponding to the forward feed and the reverse feed of the welding wire 44. Accordingly, the sum of a continuation time (hereinafter referred to as "short circuit period") Ts of the short circuit condition and a continuation time (hereinafter referred to as "arc period") Ta of the arc condition coincides with approximately the cycle T0.

The power controller U5 acquires the basic patterns of the output electric current and the output voltage from the basic-pattern setter U1. Additionally, the power controller U5 acquires respective output electric current value and output voltage value from the ammeter 56 and the voltmeter 57. The power controller U5 drives the switching circuit 51 such that the output electric current and the output voltage transition in accordance with the basic pattern. The basic patterns of the output electric current and the output voltage are set to repeat the same waveforms every short circuit period Ts and arc period Ta.

As described above, the short circuit condition and the arc condition are generated due to the forward feed and the reverse feed of the welding wire 44 by the feeding mechanism 41. Therefore, the feeding mechanism 41 corresponds to a driver that advances and retreats the welding wire 44 with respect to the workpiece W to generate the short circuit condition and the arc condition.

During the transition from the short circuit condition to the arc condition, the output voltage sharply rises (see FIG. 4B). Based on this sharp rise, the state detector U2 detects the start of the arc condition. The output voltage sharply drops during the transition from the arc condition to the short circuit condition. Based on this sharp drop, the state detector U2 detects the start of the short circuit condition.

The waveform of the output electric current in the short circuit period Ts is set to keep a state at low electric current (hereinafter, this state is referred to as "cut-off state") and then gradually increase corresponding to the elapsed time (see FIG. 4A). The rising rate of the output electric current with respect to the elapsed time can be changed at a time t1. The rising rate of the output electric current after the time t1 is slower than the rising rate of the output electric current before the time t1. The basic pattern of the output electric current in the arc period Ta is set to keep approximately a constant value and then gradually decrease corresponding to the elapsed time.

As described above, the power controller U5 controls the output electric current in accordance with the basic pattern. Additionally, the power controller U5 performs a control that reduces the output electric current before the transition from the short circuit condition to the arc condition. For details, when the time detector U3 detects that the elapsed time reaches a reference time t2 in the short circuit period Ts, the power controller U5 drives the switching circuit 51 to gradually reduce the output electric current corresponding to the elapsed time. Accordingly, the output electric current is set to the cut-off state within the short circuit period Ts. Subsequently, when the arc condition is started, the power controller U5 drives the switching circuit 51 to raise the output electric current.

Thus, with the arc welding apparatus A1 can reduce the electric current corresponding to the state where the elapsed time reaches the reference time. This allows reducing the electric current before the start of the arc condition without being affected by the irregularity of the voltage change. This can reduce spatter. Here, the short circuit condition and the arc condition are forcibly switched by the forward feed and the reverse feed of the welding wire 44. This allows estimating the continuation time of the short circuit condition with high accuracy compared with the case where the short circuit condition and the arc condition are randomly switched. This allows determining the timing for reducing the electric current based on the elapsed time.

After the elapsed time reaches the reference time t2, the power controller U5 gradually reduces the output electric current corresponding to the elapsed time. This allows continuing the supply of the electric power while reducing the electric current even after a lapse of the reference time t2. Also in the case where the short circuit condition is ended in the course of the reduction of the output electric current due to variation of the short circuit period Ts, the electric current at the end of the short circuit is suppressed by the reduction of the electric current so far. This allows reducing spatter while supplying more sufficient electric power.

Here, in the short circuit period Ts, the power controller U5 gradually raise the output electric current corresponding to the elapsed time. With this control, the time detector U3 may detect that the elapsed time reaches the reference time t2 based on the state where the output electric current reaches a reference electric current value c2 corresponding to the reference time t2.

Second Embodiment

Figure 5:
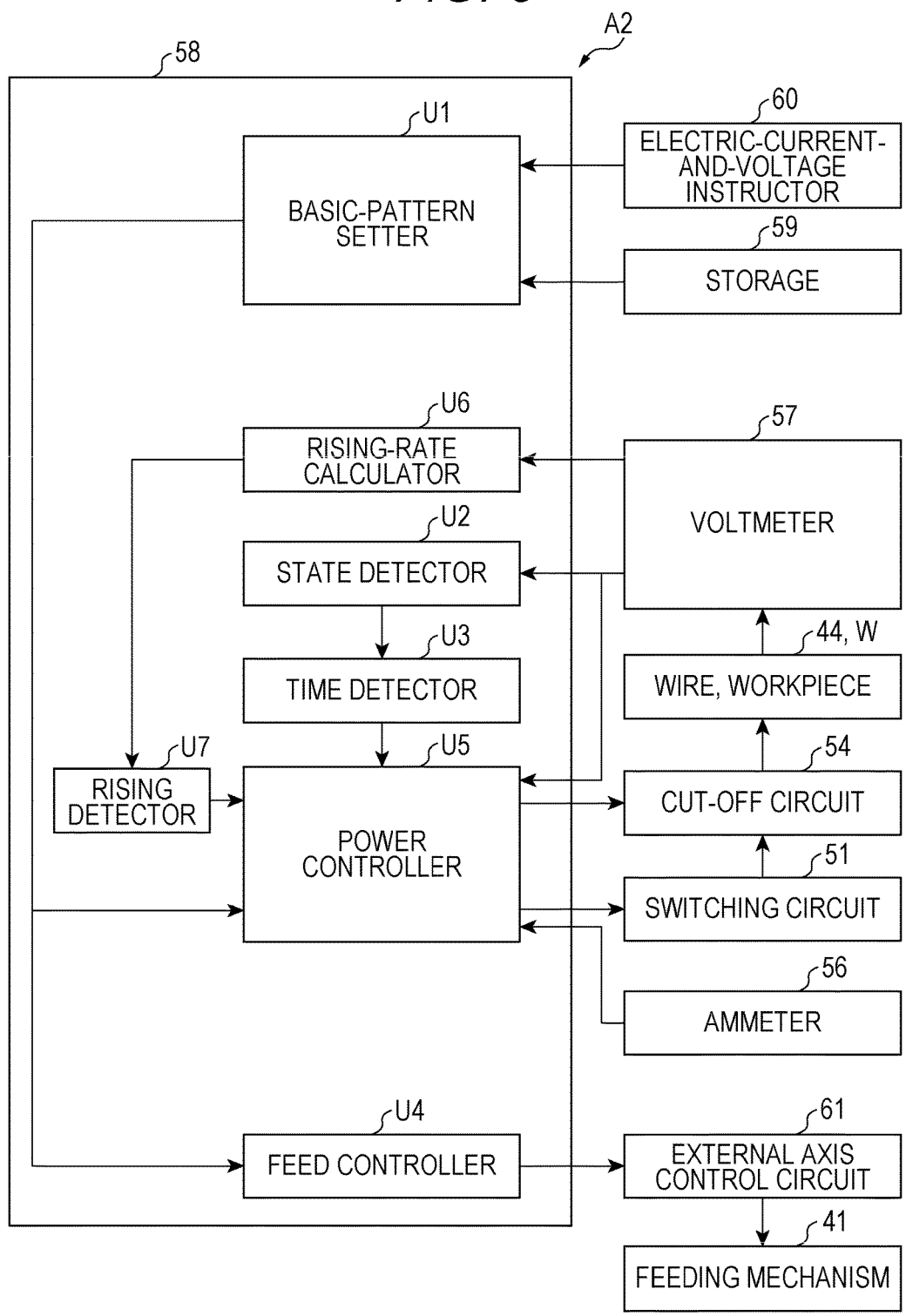
FIG. 5 is a block diagram illustrating the functional configuration of an arc welding apparatus according to a second embodiment.

An arc welding apparatus A2 according to a second embodiment differs from the arc welding apparatus A1 in the functional configuration of the welding controller 58. As illustrated in FIG. 5, the welding controller 58 of the arc welding apparatus A2 further includes a rising-rate calculator U6 and a rising detector U7 in addition to the basic-pattern setter U1, the state detector U2, the time detector U3, the feed controller U4, and the power controller U5.

The rising-rate calculator U6 acquires the output voltage value from the voltmeter 57 to calculate the rising rate (hereinafter referred to as "voltage rising rate") of the output voltage with respect to the elapsed time. The rising detector U7 detects that the voltage rising rate reaches a first reference rising rate and that the voltage rising rate reaches a second reference rising rate. Here, immediately before the transition from the short circuit condition to the arc condition, the constriction occurs in the fusion portion of the welding wire 44. In association with this occurrence, the voltage rising rate becomes large. The first reference rising rate is a voltage rising rate when the constriction occurs. The second reference rising rate is a rising rate smaller than the first reference rising rate.

The time detector U3 in the arc welding apparatus A2 detects that the elapsed time reaches the reference time. Additionally, the time detector U3 employs a time shorter than the reference time as a preliminary time and detects that the elapsed time reaches the preliminary time.

Also in the arc welding apparatus A2, the feed controller U4 outputs the target values for the feed speed to the external axis control circuit 61 so as to control the feeding mechanism 41. The power controller U5 drives the switching circuit 51 such that the output electric current and the output voltage approach the target values. With reference to FIGS. 6A to 6D and FIGS. 7A to 7D, a description will be given of a concrete example of controls performed by the feed controller U4 and the power controller U5 in the arc welding apparatus A2.

Figure 6A:
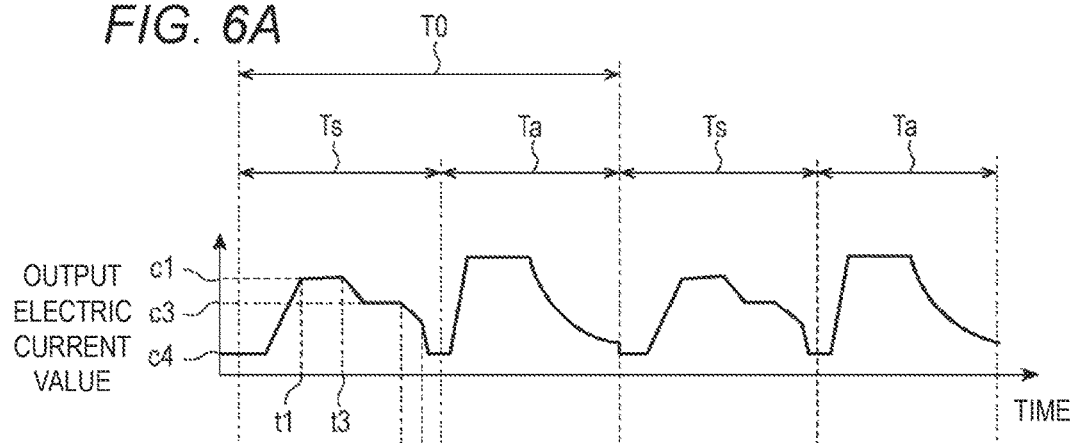
FIGS. 6A to 6D are graphs illustrating an electric current, a voltage, a voltage rising rate, and a wire feeding speed during welding.
Figure 6B:
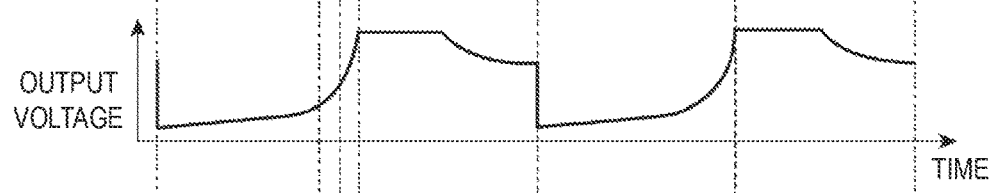
Figure 6C:
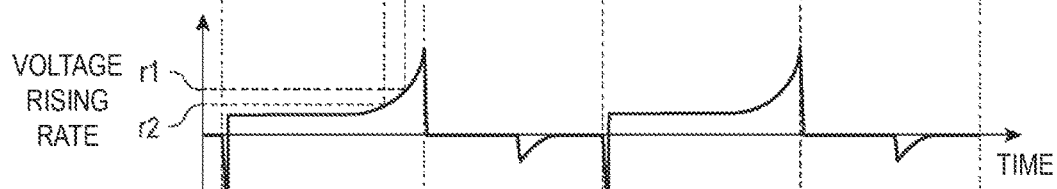
Figure 6D:
Figure 7A:
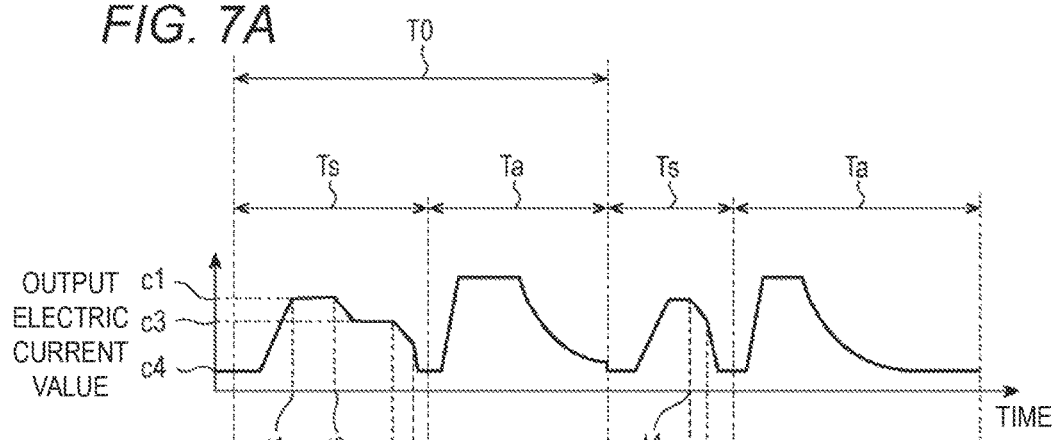
FIGS. 7A to 7D are graphs illustrating the electric current, the voltage, the voltage rising rate, and the wire feeding speed during welding illustrated in FIGS. 6A to 6D in the case where the continuation period of a short circuit condition becomes short.
Figure 7B:
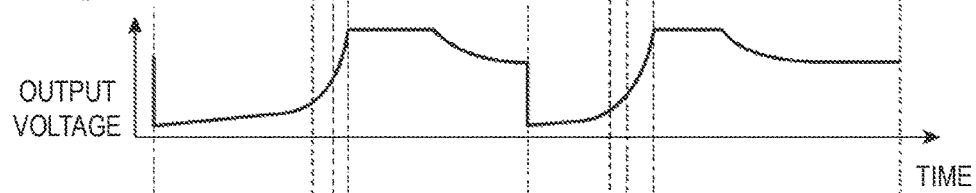
Figure 7C:
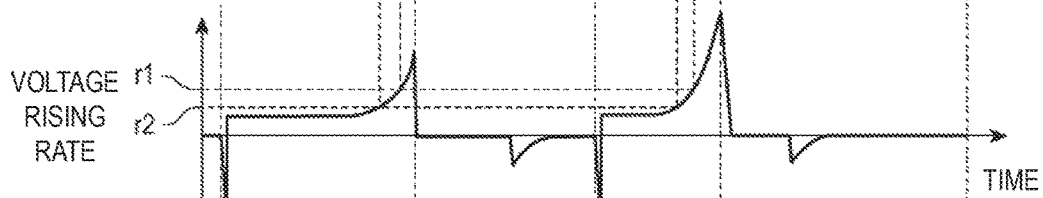
Figure 7D:

FIG. 6A and FIG. 7A are graphs each illustrating a waveform of the output electric current. In FIG. 6A and FIG. 7A, the horizontal axis denotes the time while the vertical axis denotes the output electric current value. FIG. 6B and FIG. 7B are graphs each illustrating a waveform of the output voltage. In FIG. 6B and FIG. 7B, the horizontal axis denotes the time while the vertical axis denotes the output voltage value. FIG. 6C and FIG. 7C are graphs illustrating a waveform of the voltage rising rate. In FIG. 6C and FIG. 7C, the horizontal axis denotes the time while the vertical axis denotes the voltage rising rate. FIG. 6D and FIG. 7D are graphs each illustrating a waveform of the feed speed. In FIG. 6D and FIG. 7D, the horizontal axis denotes the time while the vertical axis denotes the feed speed assuming that the forward feed side is the positive side while the reverse feed side is the negative side.

Similarly to the feed controller U4 in the arc welding apparatus A1, the feed controller U4 controls the feeding mechanism 41 to repeat the forward feed and the reverse feed of the welding wire 44 with a cycle T0 (see FIG. 6D).

The power controller U5 acquires the basic patterns of the output electric current and the output voltage from the basic-pattern setter U1. Additionally, the power controller U5 acquires respective output electric current value and output voltage value from the ammeter 56 and the voltmeter 57. The power controller U5 drives the switching circuit 51 such that the output electric current and the output voltage transition in accordance with the basic pattern. The basic patterns of the output electric current and the output voltage are set to repeat the same waveforms every short circuit period Ts and arc period Ta.

During the transition from the short circuit condition to the arc condition, the output voltage sharply rises (see FIG. 6B). Based on this sharp rise, the state detector U2 detects the start of the arc condition. The output voltage sharply drops during the transition from the arc condition to the short circuit condition. Based on this sharp drop, the state detector U2 detects the start of the short circuit condition.

The waveform of the output electric current in the short circuit period Ts is set to keep the cut-off state and then gradually increase corresponding to the elapsed time (see FIG. 6A). The rising rate of the output electric current with respect to the elapsed time can be changed at a time t1. The rising rate of the output electric current after the time t1 is slower than the rising rate of the output electric current before the time t1. The basic pattern of the output electric current in the arc period Ta is set to keep approximately a constant value and then gradually decrease corresponding to the elapsed time.

As described above, the power controller U5 controls the output electric current in accordance with the basic pattern. Additionally, the power controller U5 performs a control that reduces the output electric current before the transition from the short circuit condition to the arc condition. For details, when the time detector U3 detects that the elapsed time reaches a reference time t3 in the short circuit period Ts, the power controller U5 drives the switching circuit 51 to gradually reduce the output electric current corresponding to the elapsed time. This reduces the output electric current to a first electric current value c3. The reference time t3 is set to be shorter than the reference time t2 in the arc welding apparatus A1.

Subsequently, when the rising detector U7 detects that the voltage rising rate reaches a second reference rising rate r2, the power controller U5 drives the switching circuit 51 to gradually reduce the output electric current corresponding to the elapsed time. This reduces the output electric current to a second electric current value c4. The second electric current value c4 is a value smaller than the first electric current value c3. As an example, the second electric current value c4 is a value in the above-described state at low electric current. In this example, the transition of the output electric current to the second electric current value c4 corresponds to the occurrence of the cut-off state.

In the course of reduction of the output electric current to the second electric current value c4, when the rising detector U7 detects that the voltage rising rate reaches a first reference rising rate r1, the power controller U5 causes the cut-off circuit 54 to cut off the output electric current. Accordingly, the output electric current sharply drops compared with an output electric current before the voltage rising rate reaches the first reference rising rate r1. That is, the power controller U5 increases the dropping rate of the output electric current when the voltage rising rate reaches the first reference rising rate r1.

Here, due to the irregularity of the transition between the short circuit condition and the arc condition, the voltage rising rate may reach the second reference rising rate r2 before the elapsed time reaches the reference time t3. The right sides of FIGS. 7A to 7D illustrate the case where the voltage rising rate reaches the second reference rising rate r2 at a time t4 before the reference time t3 as an example. In this case, the power controller U5 drives the switching circuit 51 to gradually reduce the output electric current corresponding to the elapsed time without waiting for the elapsed time to reach the reference time t3. This reduces the output electric current to the second electric current value c4.

However, the power controller U5 ignores the fact that the voltage rising rate reaches the second reference rising rate r2 until the time detector U3 detects that the elapsed time reaches the preliminary time. The preliminary time may be, for example, t1 at which the rising rate of the output electric current is changed.

In the course of reduction of the output electric current to the second electric current value c4, when the rising detector U7 detects that the voltage rising rate reaches the first reference rising rate r1, the power controller U5 causes the cut-off circuit 54 to cut off the output electric current.

When the state detector U2 detects the start of the arc condition after the power controller U5 reduces the output electric current, the power controller U5 drives the switching circuit 51 to raise the output electric current.

Thus, the power controller U5 in the arc welding apparatus A2 reduces the output electric current to the first electric current value c3 corresponding to the state where the elapsed time reaches the reference time t3. Subsequently, the power controller U5 reduces the output electric current to the second electric current value c4 smaller than the first electric current value c3 corresponding to the state where the voltage rising rate reaches the second reference rising rate r2. Accordingly, after a lapse of the reference time t3, the electric current is reduced to the first electric current value c3. This allows reducing the output electric current before the start of the arc condition without being affected by the irregularity of the voltage change. On the other hand, even after a lapse of the reference time t3, until the voltage rising rate reaches the second reference rising rate r2, the electric power supply at the first electric current value c3 can be continued. This allows reducing spatter while supplying more sufficient electric power.

The power controller U5 gradually reduces the output electric current corresponding to the elapsed time after the voltage rising rate reaches the second reference rising rate r2. This allows continuing the supply of electric power while reducing the electric current even after the voltage rising rate reaches the second reference rising rate r2. The short circuit condition might be ended in the course of the reduction of the output electric current due to variation of the short circuit period Ts. Also in this case, the electric current at the end of the short circuit is suppressed by the reduction of the electric current so far. This allows reducing spatter while supplying more sufficient electric power.

The power controller U5 increases the dropping rate of the output electric current when the voltage rising rate reaches the first reference rising rate r1 in the course of the reduction of the output electric current to the second electric current value c4. This allows more reliably suppressing the electric current at the end of the short circuit. This more reliably reduces spatter.

The power controller U5 also reduces the output electric current to the second electric current value c4 when the voltage rising rate reaches the second reference rising rate r2 before the elapsed time reaches the reference time t3. Accordingly, also in the case where the short circuit period Ts becomes shorter than the reference time t3 due to the variation, the electric current can be reduced corresponding to the state where the voltage rising rate reaches the second reference rising rate r2. Therefore, this allows more reliably reducing the electric current before the start of the arc condition and reducing spatter.

The power controller U5 ignores the fact that the voltage rising rate reaches the second reference rising rate r2 until the elapsed time reaches the preliminary time. The voltage rising rate might reach the second reference rising rate r2 except during the transition to the arc condition due to the irregularity of the voltage change or similar reason. Also in this case, reduction of the output electric current causes unnecessary electric power reduction. Ignoring the fact that the voltage rising rate reaches the second reference rising rate r2 until the elapsed time reaches the preliminary time allows suppressing the unnecessary electric power reduction.

Here, the power controller U5 gradually raises the output electric current corresponding to the elapsed time in the short circuit period Ts. With this control, the time detector U3 may detect that the elapsed time reaches the preliminary time based on the state where the output electric current reaches a preliminary electric current value corresponding to the preliminary time. For example, in the case where the preliminary time is t1 in FIGS. 6A to 6D and FIGS. 7A to 7D, the preliminary electric current value is c1.

The embodiments of this disclosure have been described above. This disclosure is not limited to the above-described embodiments. Various changes of this disclosure may be made without departing from the spirit and scope of this disclosure. For example, the external controller 6 need not be incorporated in the robot controller 3. The external controller 6 may be one independent unit or may be integrated with the welding power supply 5.

In this embodiment, driving means corresponds to the feeding mechanism 41 and state detecting means corresponds to the state detector U2. Further, time detecting means corresponds to the time detector U3 and power control means corresponds to the power controller U5.

An arc welding apparatus according to one embodiment of this disclosure may be the following first arc welding apparatus. The first arc welding apparatus is an apparatus for performing welding while repeatedly generating a short circuit condition and an arc condition. The apparatus includes a driver, a state detector, a time detector, and a power controller. The driver is configured to advance and retreat a welding consumable with respect to a workpiece. The state detector is configured to detect starts of the short circuit condition and the arc condition based on a voltage between the workpiece and the welding consumable. The time detector is configured to detect that an elapsed time from the start of the short circuit condition reaches a reference time using a time shorter than an estimated continuation time of the short circuit condition as the reference time. The power controller is configured to reduce an electric current between the workpiece and the welding consumable corresponding to a state where the elapsed time reaches the reference time so as to raise the electric current after the start of the arc condition.

An arc welding method according to one embodiment of this disclosure may be the following first arc welding method. The first arc welding method is a method performed by an arc welding apparatus for performing welding while repeatedly generating a short circuit condition and an arc condition. The method includes: advancing and retreating a welding consumable with respect to a workpiece; detecting starts of the short circuit condition and the arc condition based on a voltage between the workpiece and the welding consumable; detecting that an elapsed time from the start of the short circuit condition reaches a reference time using a time shorter than an estimated continuation time of the short circuit condition as the reference time; and reducing an electric current between the workpiece and the welding consumable corresponding to a state where the elapsed time reaches the reference time so as to raise the electric current after the start of the arc condition.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An arc welding apparatus, comprising:
   a driver configured to advance and retreat a welding consumable with respect to a workpiece to generate a short circuit condition and an arc condition; and
   a welding computer configured to control the driver and a switching circuit, the welding computer further configured to, within a cycle that includes the short circuit condition followed by the arc condition:
      detect a start of the short circuit condition and a start of the arc condition based on a voltage between the workpiece and the welding consumable,
      detect when an elapsed time reaches a reference time, the elapsed time beginning at the start of the short circuit condition of the cycle, the reference time being shorter than an estimated length of time of the short circuit condition,
      calculate a voltage rising rate from an output voltage value from a voltmeter that measures a voltage between the workpiece and the welding consumable,
      detect that the voltage rising rate reaches a first reference rising rate and a second reference rising rate during the short circuit condition of the cycle, the first reference rising rate being a voltage rising rate when constriction occurs in the welding consumable before the start of the arc condition, the second reference rising rate being a rising rate smaller than the first reference rising rate,
      reduce an electric current between the workpiece and the welding consumable when the elapsed time reaches the reference time during the short circuit condition of the cycle,
      then further reduce the electric current until the electric current reaches a predetermined electric current value in response to a determination that the voltage rising rate reaches the second reference rising rate during the short circuit condition of the cycle,
      then further reduce the electric current in response to a determination that the voltage rising rate reaches the first reference rising rate during the short circuit condition of the cycle, and
      then raise the electric current after the start of the arc condition of the cycle.

2. The arc welding apparatus according to claim 1, wherein the welding computer is configured to:
   gradually raise the electric current after the start of the short circuit condition of the cycle and prior to the elapsed time reaching the reference time during the short circuit condition of the cycle, and
   detect that the elapsed time reaches the reference time based on a state where the electric current reaches a reference electric current value corresponding to the reference time.

3. The arc welding apparatus according to claim 1, wherein
   the welding computer is configured to gradually reduce the electric current after the elapsed time reaches the reference time.

4. The arc welding apparatus according to claim 1, wherein
   the welding computer is configured to:
      reduce the electric current to a first electric current value corresponding to the state where the elapsed time reaches the reference time; and
      then further reduce the electric current to the predetermined electric current value, which is a second electric current value smaller than the first electric current value.

5. The arc welding apparatus according to claim 4, wherein
   the welding computer also reduces the electric current to the second electric current value in response to a determination that the voltage rising rate reaches the second reference rising rate before the elapsed time reaches the reference time, and then raises the electric current after the start of the arc condition.

6. The arc welding apparatus according to claim 5, wherein
   the welding computer is also configured to detect that the elapsed time reaches a preliminary time using a time shorter than the reference time as the preliminary time, and
   the welding computer is configured to ignore a fact that the voltage rising rate reaches the second reference rising rate until the elapsed time reaches the preliminary time.

7. The arc welding apparatus according to claim 6, wherein
   the welding computer is configured to:
      gradually raise the electric current after the start of the short circuit condition of the cycle and prior to the elapsed time reaching the reference time during the short circuit condition of the cycle, and
      detect that the elapsed time reaches the preliminary time based on a state where the electric current reaches a preliminary electric current value corresponding to the preliminary time.

8. The arc welding apparatus according to claim 4, wherein
   the welding computer is configured to gradually reduce the electric current until the electric current reaches the second electric current value after the voltage rising rate reaches the second reference rising rate.

9. The arc welding apparatus according to claim 8, wherein
   the welding computer increases a dropping rate of the electric current when the voltage rising rate reaches the first reference rising rate in a course of reduction of the electric current to the second electric current value.

10. The arc welding apparatus according to claim 1, further comprising:
    an external controller configured to acquire set values of an electric current and a voltage from outside, wherein
    the welding computer is configured to:
       acquire the set values of the electric current and the voltage from the external controller so as to set a basic pattern that is a control pattern appropriate for the set values, and
       control the electric current in accordance with the basic pattern.

11. The arc welding apparatus according to claim 10, wherein
    the welding computer is configured to set a basic pattern of a feed speed of the welding consumable, and the welding computer is configured to control the driver to repeat the advance and retreat of the welding consumable in accordance with the basic pattern.

12. An arc welding system, comprising:
the arc welding apparatus according to claim 1; and
a welding robot configured to hold and move the driver.

13. An arc welding method performed by an arc welding apparatus, comprising:
advancing and retreating a welding consumable with respect to a workpiece to generate a short circuit condition and an arc condition within a cycle;
detecting a start of the short circuit condition and a start of the arc condition based on a voltage between the workpiece and the welding consumable;
detecting when an elapsed time reaches a reference time, the elapsed time beginning at the start of the short circuit condition of the cycle, the reference time being shorter than an estimated length of time of the short circuit condition;
calculating a voltage rising rate from an output voltage value from a voltmeter that measures a voltage between the workpiece and the welding consumable;
determining when the voltage rising rate reaches a first reference rising rate during the short circuit condition of the cycle, the first reference rising rate being a voltage rising rate when constriction occurs in the welding consumable before the start of the arc condition;
determining when the voltage rising rate reaches a second reference rising rate during the short circuit condition of the cycle, the second reference rising rate being a rising rate smaller than the first reference rising rate;
reducing an electric current between the workpiece and the welding consumable when the elapsed time reaches the reference time during the short circuit condition of the cycle;
then further reducing the electric current until the electric current reaches a predetermined electric current value in response to a determination that the voltage rising rate reaches the second reference rising rate during the short circuit condition of the cycle;
then further reducing the electric current in response to the determination that the voltage rising rate reaches the first reference rising rate during the short circuit condition of the cycle; and
then raising the electric current after the start of the arc condition of the cycle.

14. An arc welding apparatus, comprising:
driving means for advancing and retreating a welding consumable with respect to a workpiece to generate a short circuit condition and an arc condition; and
a computer configured to control the driving means and a switching circuit, the computer further configured to, within a cycle that includes the short circuit condition followed by the arc condition:
detect a start of the short circuit condition and a start of the arc condition based on a voltage between the workpiece and the welding consumable,
detect when an elapsed time reaches a reference time, the elapsed time beginning at the start of the short circuit condition of the cycle, the reference time being shorter than an estimated length of time of the short circuit condition,
calculate a voltage rising rate from an output voltage value from a voltmeter that measures a voltage between the workpiece and the welding consumable,
detect that the voltage rising rate reaches a first reference rising rate and a second reference rising rate during the short circuit condition of the cycle, the first reference rising rate being a voltage rising rate when constriction occurs in the welding consumable before the start of the arc condition, the second reference rising rate being a rising rate smaller than the first reference rising rate,
reduce an electric current between the workpiece and the welding consumable when the elapsed time reaches the reference time during the short circuit condition of the cycle,
then further reduce the electric current until the electric current reaches a predetermined electric current value in response to a determination that the voltage rising rate reaches the second reference rising rate during the short circuit condition of the cycle,
then further reduce the electric current in response to a determination that the voltage rising rate reaches the first reference rising rate during the short circuit condition of the cycle, and
then raise the electric current after the start of the arc condition of the cycle.

15. The arc welding apparatus according to claim 1, wherein
the driver is configured to continue retreating the welding consumable after the welding computer reduces the electric current when the voltage rising rate reaches the first reference rising rate and before the welding computer detects the start of the arc condition.

16. The arc welding apparatus according to claim 1, wherein
the welding computer is configured to hold the electric current at an approximately constant value when the welding computer detects the arc condition and subsequently decrease the electric current when the welding computer continues to detect the arc condition.

17. The arc welding apparatus according to claim 1, wherein
the welding computer is configured to reduce the electric current in response to the determination that the voltage rising rate reaches the first reference rising rate such that the current is reduced during a time immediately following the determination that the voltage rising rate has reached the first reference rising rate.

18. The arc welding apparatus according to claim 1, wherein
the welding computer is further configured to:
reduce the electric current in response to a determination that the voltage rising rate reaches the second reference rising rate, and
reduce the electric current at a faster rate in response to the determination that the rising rate has reached the first reference rising rate as compared to a rate of reduction of the electric current in response to the determination that the rising rate has reached the second reference rising rate.

19. The arc welding method according to claim 13, wherein
the reducing of the electric current in response to the determination that the voltage rising rate reaches the first reference rising rate is performed by reducing the current during a time immediately following the determination that the voltage rising rate has reached the first reference rising rate.

20. The arc welding method according to claim 13, wherein the reducing of the electric current in response to the determination that the rising rate has reached the first reference rising rate is at a faster rate as compared to a rate of reduction of the electric current when reducing the electric current in response to the determination that the voltage rising rate reaches the second reference rising rate.

21. The arc welding apparatus according to claim 1, wherein
the welding computer is configured to, in response to a determination that the voltage rising rate reaches the first reference rising rate after the voltage rising rate has reached the second reference rising rate, increase a rate at which the electric current is dropped.

22. The arc welding method according to claim 13, wherein
the reducing the electric current in response to the determination that the voltage rising rate reaches the first reference rising rate is performed by increasing a rate at which the electric current is dropped during the reducing the electric current until the electric current reaches the predetermined electric current value.

23. The arc welding apparatus according to claim 14, wherein
the computer is configured to, in response to a determination that the voltage rising rate reaches the first reference rising rate after the voltage rising rate has reached the second reference rising rate, increase a rate at which the electric current is dropped.

* * * * *